United States Patent
Harbaugh

(10) Patent No.: US 9,038,312 B2
(45) Date of Patent: May 26, 2015

(54) INJECTION-MOLDED PLANTER HAVING UNDERCUTS AND PROCESS FOR MANUFACTURING

(75) Inventor: Kenneth A. Harbaugh, Destin, FL (US)

(73) Assignee: ATT SOUTHERN INC., Camp Hill, PA (US)

( * ) Notice: Subject to any disclaimer, the term of this patent is extended or adjusted under 35 U.S.C. 154(b) by 478 days.

(21) Appl. No.: 13/253,291

(22) Filed: Oct. 5, 2011

(65) Prior Publication Data

US 2012/0260570 A1 Oct. 18, 2012

Related U.S. Application Data

(60) Provisional application No. 61/390,298, filed on Oct. 6, 2010.

(51) Int. Cl.
*A01G 9/02* (2006.01)
*A01G 9/04* (2006.01)

(52) U.S. Cl.
CPC . *A01G 9/02* (2013.01); *A01G 9/042* (2013.01)

(58) Field of Classification Search
USPC ............ 47/66.1, 66.2, 71, 72; 217/93, 72, 88, 217/92, 90
See application file for complete search history.

(56) References Cited

U.S. PATENT DOCUMENTS

| | | | | |
|---|---|---|---|---|
| 48,996 A | * | 7/1865 | Percival | 215/376 |
| 59,097 A | * | 10/1866 | Tweddle | 217/93 |
| 128,310 A | * | 6/1872 | Hill | 217/93 |
| 381,077 A | * | 4/1888 | Long | 229/67 |
| 638,547 A | * | 12/1899 | Betzoldt et al. | 217/1 |
| 840,212 A | * | 1/1907 | Hoff | 217/93 |
| 951,912 A | * | 3/1910 | Hoff | 217/93 |
| 1,011,176 A | * | 12/1911 | Emmrich | 217/93 |
| 1,104,351 A | * | 7/1914 | Emmrich | 217/72 |
| 1,177,723 A | * | 4/1916 | Puff | 217/89 |
| 1,334,186 A | * | 3/1920 | St Peter | 217/44 |
| 1,500,917 A | * | 7/1924 | Bell | 220/4.09 |
| 1,557,712 A | | 10/1925 | Little | |
| 1,778,150 A | | 10/1930 | Freeburg | |
| 1,899,342 A | * | 2/1933 | MacChesney | 217/91 |
| 1,936,909 A | * | 11/1933 | MacChesney | 29/469.5 |
| 2,089,527 A | * | 8/1937 | Andrew | 229/5.7 |
| 2,192,424 A | * | 3/1940 | Wilson | 493/103 |
| 2,790,269 A | | 4/1957 | Coleman, Jr. | |

(Continued)

FOREIGN PATENT DOCUMENTS

| | | | | |
|---|---|---|---|---|
| JP | 04036121 A | * | 2/1992 | A01G 9/02 |
| JP | 2009106174 A | * | 5/2009 | |

*Primary Examiner* — Son T Nguyen
(74) *Attorney, Agent, or Firm* — Eckert Seamans Cherin & Mellott, LLC; David C. Jenkins

(57) ABSTRACT

A planter for holding a plant includes a container having an open upper end. The container has side walls extending downward from the upper end and tapering inward to a lower end. A base at the lower end of the container has a diameter smaller than the diameter of the upper end. A circumferential ring surrounds the lower end of the container. The circumferential ring has an upper edge that extends outward from the container by a distance such that removal of the container and ring from a mold as a single unit would be inhibited. Accordingly, the container and the circumferential ring are molded from a thermoplastic material as separate components. The circumferential ring fits around the lower end of the container and is held in place by a mechanical interlock between the container and the ring.

2 Claims, 6 Drawing Sheets

(56) References Cited

U.S. PATENT DOCUMENTS

| | | | |
|---|---|---|---|
| 2,963,256 A * | 12/1960 | Borah | 248/346.04 |
| 3,047,183 A * | 7/1962 | Papa | 220/4.33 |
| 3,079,037 A | 2/1963 | Schechter | |
| 3,927,782 A * | 12/1975 | Edwards | 215/372 |
| 3,961,443 A | 6/1976 | Insalaco | |
| 3,965,616 A * | 6/1976 | Ridgeway | 47/65.5 |
| 4,145,841 A * | 3/1979 | Woolpert | 47/66.1 |
| 4,216,622 A * | 8/1980 | Hollenbach et al. | 47/71 |
| 4,706,833 A | 11/1987 | Korcz et al. | |
| 4,955,491 A * | 9/1990 | Marshall et al. | 215/12.1 |
| 5,018,641 A * | 5/1991 | Carpenter et al. | 220/634 |
| 5,400,545 A * | 3/1995 | Medina | 47/84 |
| 5,403,634 A * | 4/1995 | Mauffette | 428/34.3 |
| 5,535,548 A | 7/1996 | Weder et al. | |
| 5,930,951 A * | 8/1999 | Wong | 47/66.1 |
| 6,173,530 B1 * | 1/2001 | Holt | 47/66.1 |
| 6,439,418 B1 * | 8/2002 | Immerman et al. | 220/630 |
| 6,564,960 B1 * | 5/2003 | Grindstaff et al. | 220/4.31 |
| 7,306,113 B2 * | 12/2007 | El-Saden et al. | 220/592.17 |
| 8,464,897 B2 * | 6/2013 | Bloom | 220/729 |
| 2004/0144027 A1 * | 7/2004 | Dines | 47/66.1 |
| 2004/0251259 A1 * | 12/2004 | Copeland | 220/630 |
| 2009/0056215 A1 * | 3/2009 | Yang | 47/66.1 |
| 2009/0241417 A1 * | 10/2009 | Smith | 47/66.2 |
| 2011/0056958 A1 * | 3/2011 | Lalwani | 220/574 |
| 2012/0060415 A1 * | 3/2012 | Harbaugh | 47/66.1 |

* cited by examiner

INJECTION-MOLDED PLANTER HAVING UNDERCUTS AND PROCESS FOR MANUFACTURING

CROSS-REFERENCE TO RELATED APPLICATIONS

This application claims priority to U.S. provisional application Ser. No. 61/390,298, filed Oct. 6, 2010.

TECHNICAL FIELD

The present invention relates generally to injection-molded planters, and relates more specifically to an injection-molded planter having one or more undercuts and to a process for manufacturing such a planter.

BACKGROUND OF THE INVENTION

Barrels of the type used in aging whiskey are well known. Such barrels are typically made of white oak and are held together by double riveted steel hoops. Whiskey barrels are typically around three feet tall and two feet in diameter at their widest point.

By law, bourbon, the only native U.S. whiskey, must be aged in a new barrel. Other countries do not have comparable requirements. Thus, after being used to age one barrel of bourbon, the used barrels have historically been exported from the United States to other countries, where they are used to make Scotch, Irish whiskey, rum, tequila, and the like.

At some point the cost of shipping used barrels overseas began to exceed the price of a new whiskey barrel, effectively eliminating the overseas market for used barrels. Thus U.S. distilleries began to look for alternative uses for the used barrels. One popular use was to cut open the barrel and convert it into a planter. The rustic appearance and sturdy construction of the whiskey barrel is favorably suited for this use.

A conventional prior art whiskey barrel planter has a barrel body comprised of wooden staves. Metal bands adjacent the upper and lower ends of the barrel body hold the staves in place. The metal bands have a thickness such that the upper edges of the bands extend outward from the main body of the barrel.

Advances in plastic injection molding subsequently lowered the price of planters so that the converted whiskey barrel was not financially competitive with molded planters. However, for reasons that will be explained below, it has proven difficult to mold a whiskey barrel planter using conventional injection molding techniques. Meanwhile demand for the rustic appearance of whiskey barrel planters remains.

SUMMARY OF THE DISCLOSED EMBODIMENTS

Stated generally, the planters disclosed herein include a container and a decorative circumferential ring. The ring has an undercut, such that if the container and ring were molded as a single piece, the undercut would inhibit removal of the article from a conventional two-piece mold. To address this problem, the container and ring are molded separately and assembled after being removed from the mold.

The container of the disclosed embodiments has side walls extending downward from the upper end and tapering inward to a lower end. A base at the lower end of the container has a diameter smaller than the diameter of the upper end. The separate circumferential ring is positioned on the lower portion of the container adjacent the base so as to surround the lower end of the container. The circumferential ring is held in place on the lower end of the container by a mechanical interlock between the container and the ring.

Objects, features, and advantages of the present invention will become apparent upon reading the following specification, when taken in conjunction with the drawings and the appended claims.

DETAILED DESCRIPTION OF THE DISCLOSED EMBODIMENT

Figure 1:
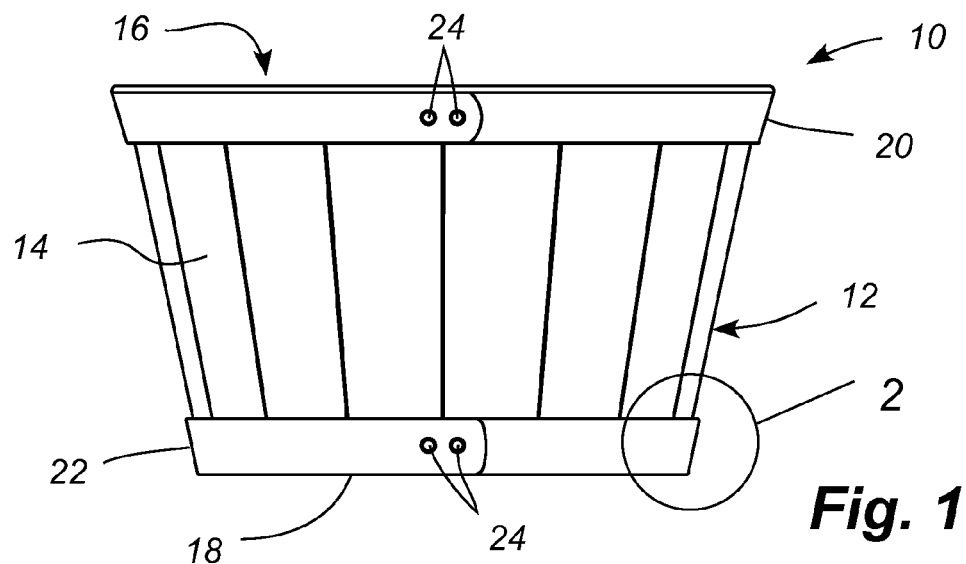
FIG. 1 is an elevation view of a barrel planter.

Referring now to the drawings, in which like numerals indicate like elements throughout the several views, FIG. 1 depicts a whiskey barrel planter 10. The barrel planter has a main body portion 12 molded to look like a plurality of adjoining staves 14. The main body portion 12 has an open upper end 16 and a base 18 at its lower end. A circumferential upper ring 20 is formed at the upper end of the body portion 12 to replicate the appearance of the metal hoop that holds the upper ends of the staves together in a conventional wooden whiskey barrel planter. Similarly, a circumferential lower ring 22 is located at the lower end of the body portion 12 to replicate the appearance of the metal hoop that holds the lower ends of the staves together in a conventional wooden whiskey barrel planter. Optionally the rings 20, 22 can be formed to mimic the appearance of two hoop ends overlapping, and fasteners 24 can be formed on the rings 20, 22 to provide the appearance of fasteners that hold the overlapping ends of the hoops together in a conventional wooden whiskey barrel. It will be understood that the fasteners, staves, and overlapping hoop ends are for decorative purposes only and are not intended to limit the invention.

Figure 2:
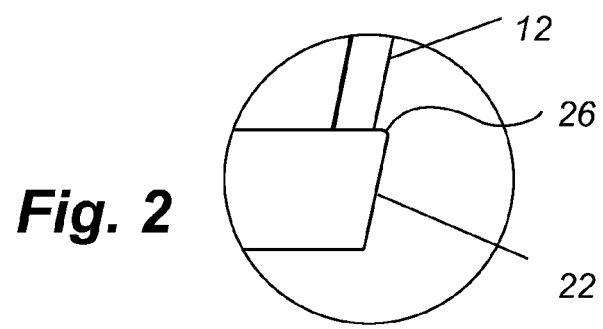
FIG. 2 is an enlarged view of the portion of the barrel planter identified by the circle 2 in FIG. 1.

FIG. 2 is an enlarged view of a portion of the lower ring 22 and main body portion 12 of the planter 10. The upper edge 26 of the lower ring 22 projects away from the main body portion 12 and forms an undercut. For purposes of this application, an UNDERCUT will be understood to mean a protuberance or indentation on a molded article that impedes withdrawal of the article from a two-piece, rigid mold.

It is difficult to use conventional injection molding techniques to manufacture a realistic plastic whiskey barrel planter as a single component. If one were to attempt to mold the planter 10 as a single piece using conventional injection molding techniques, the undercut between the upper edge 26 of the lower ring 22 and the barrel body 12 would make it difficult or impossible to remove the article from a conventional two-piece injection molding machine without the use of lifters. Adding lifters to the mold greatly increases the expense and difficulty of creating the mold.

To address the problem of removing the planter 10 from a two-piece mold, the planter of the disclosed embodiment is molded as two separate parts: the main body portion 12 and the lower ring 22. Each of these two parts is injection-molded separately, and the molded parts are assembled to form a complete barrel 10 which realizes a conventional wooden whiskey barrel planter in design.

Figure 3:
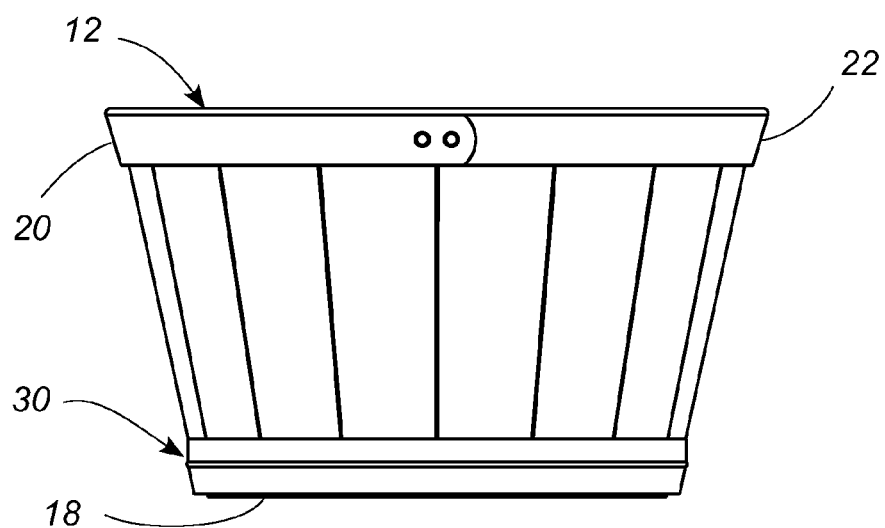
FIG. 3 is an elevation view of a main body portion of the barrel planter of FIG. 1.

FIG. 3 illustrates the main body portion 12 of the injection-molded whiskey barrel planter of FIG. 1. The upper ring 20 is formed as part of the main body portion 12. At the lower end 28 of the main body portion 12 a circumferential wall 30 is formed. The wall 30 will be explained in further detail below in conjunction with the discussion of FIG. 7.

Figure 4:
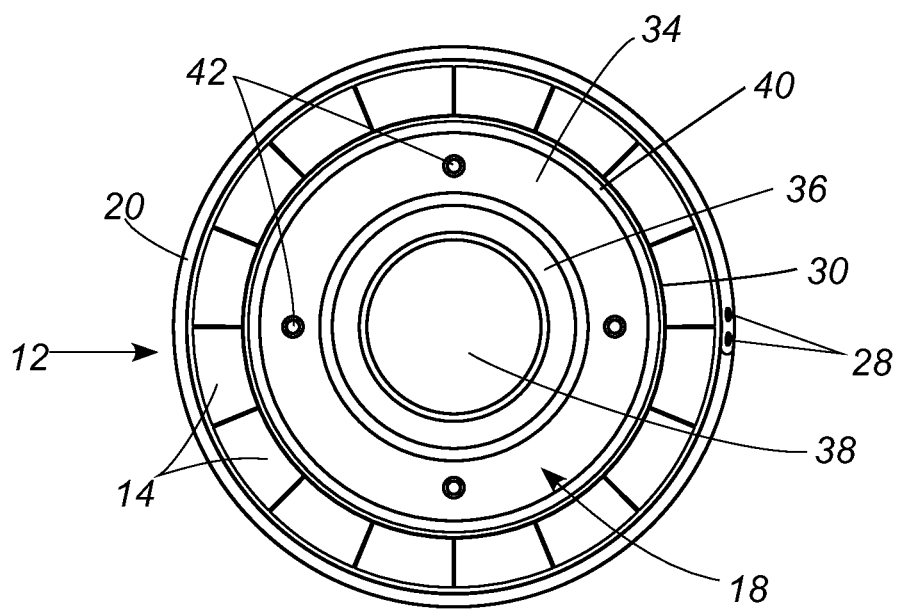
FIG. 4 is a bottom view of the main body portion of FIG. 3.
Figure 5:
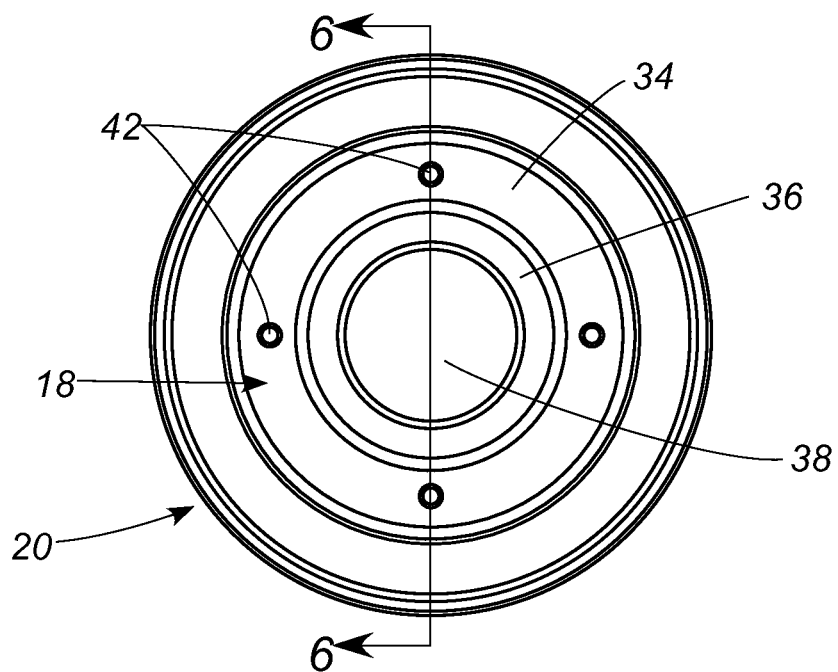
FIG. 5 is a top view of the main body portion of FIG. 3.
Figure 6:
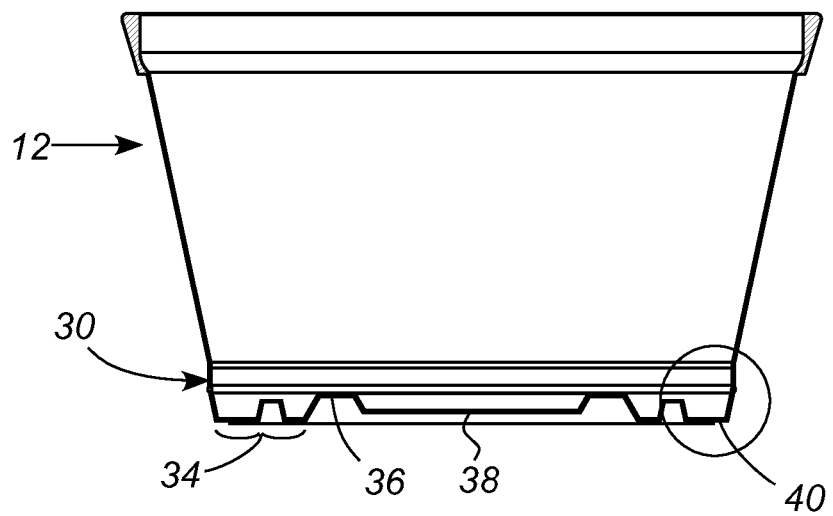
FIG. 6 is a vertical cross-section as viewed along line 6-6 of FIG. 5.

Reference is now made to FIGS. 4-6. The base 18 optionally has an outer annular portion 34, an inner annular portion 36, and a central circular portion 38. An annular channel 40 is formed about the lower periphery of the base 18. Drainage holes 42 are spaced around the outer annular portion 34 of the base 18.

Figure 7:
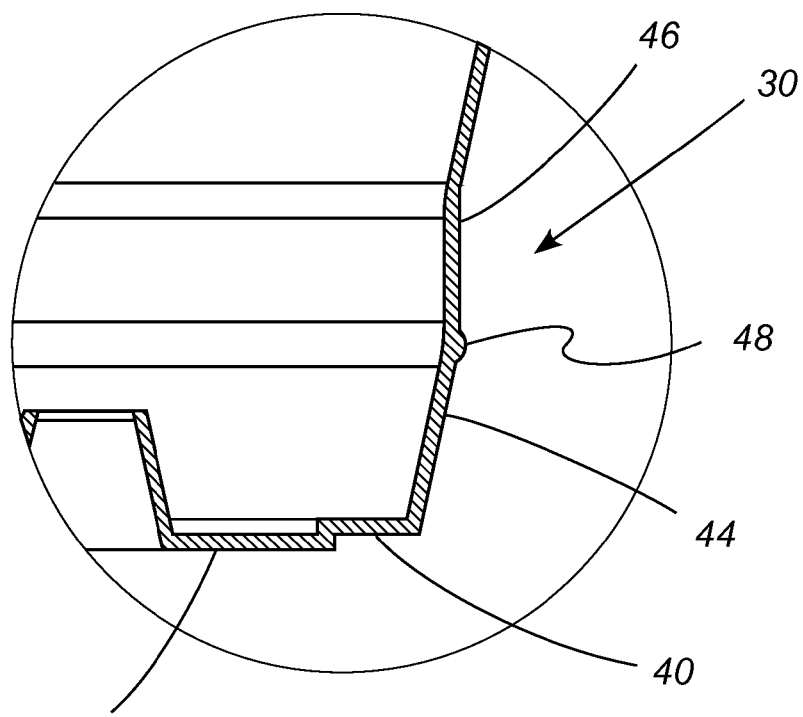
FIG. 7 is an enlarged view of a segment of the main body portion identified by the circle 7 in FIG. 6.

Referring now to FIG. 7, the circumferential wall 30 includes an angled lower wall portion 44 that slants upward and outward from the base 18, and an upper wall portion 46 extending substantially vertically upward from the upper end of the lower wall portion 44. A male interlock projection 48 is located at an intermediate location of the circumferential wall 20. Optionally the projection 48 can be semicircular in cross section.

Figure 8:
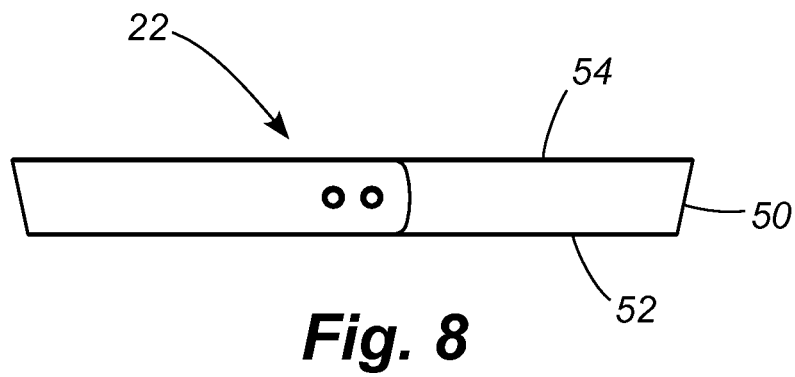
FIG. 8 is a side view of the lower ring of the planter of FIG. 1.
Figure 9:
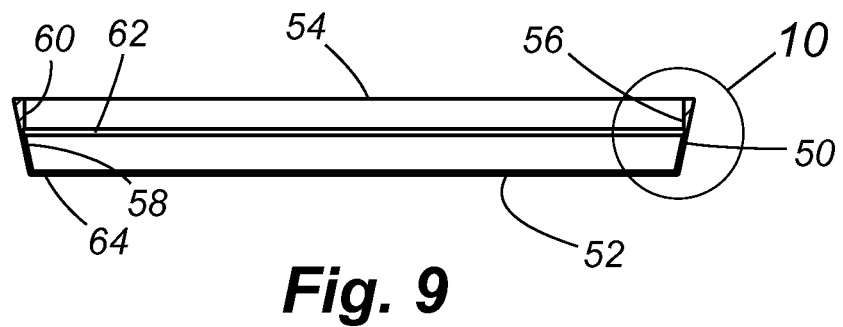
FIG. 9 is a vertical cross-section of the lower ring of FIG. 8.
Figure 10:
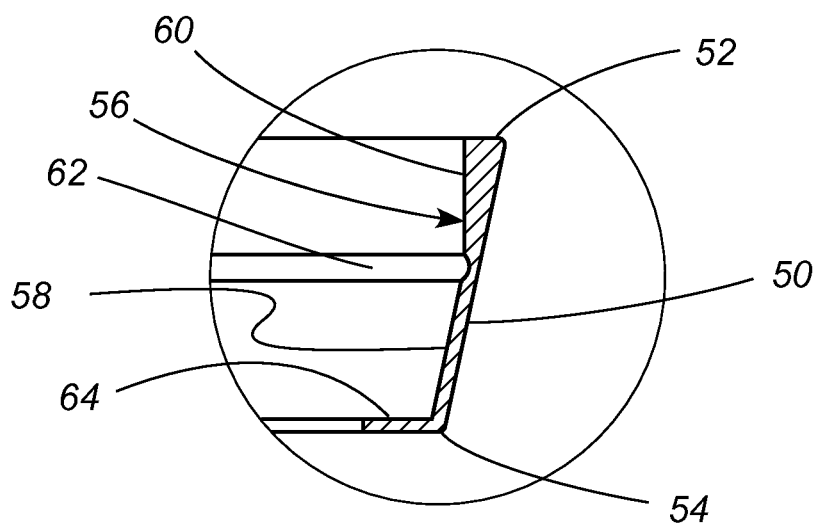
FIG. 10 is an enlarged view of a portion of the lower ring identified by the circle 10 in FIG. 9.

FIGS. 8-10 are various views of the lower ring 22. As will be seen, the lower ring 22 is generally frustoconical, with a substantially straight outer wall 50 extending upward and outward from its lower edge 52 to its upper edge 54. In FIGS. 9 and 10 it can be seen that the inner wall 56 of the lower ring 22 has a shape generally corresponding to the outer circumferential wall 30 of the main body portion 12. More specifically, the inner wall 56 of the disclosed embodiment includes an angled lower wall portion 58 that slants upward and outward from the lower edge 52 of the ring 22. An upper wall portion 60 extends substantially vertically upward from the upper end of the lower wall portion 58 to the upper edge 54 of the ring 22. A female interlock recess 62 is located at an intermediate point along the inner wall 56 and is configured to receive the male interlock projection 48 on the circumferential wall 30 of the main body portion 12.

As can further be seen in FIGS. 9 and 10, an annular flange 64 extends inward from the lower edge 52 of the ring 22.

Figure 11:
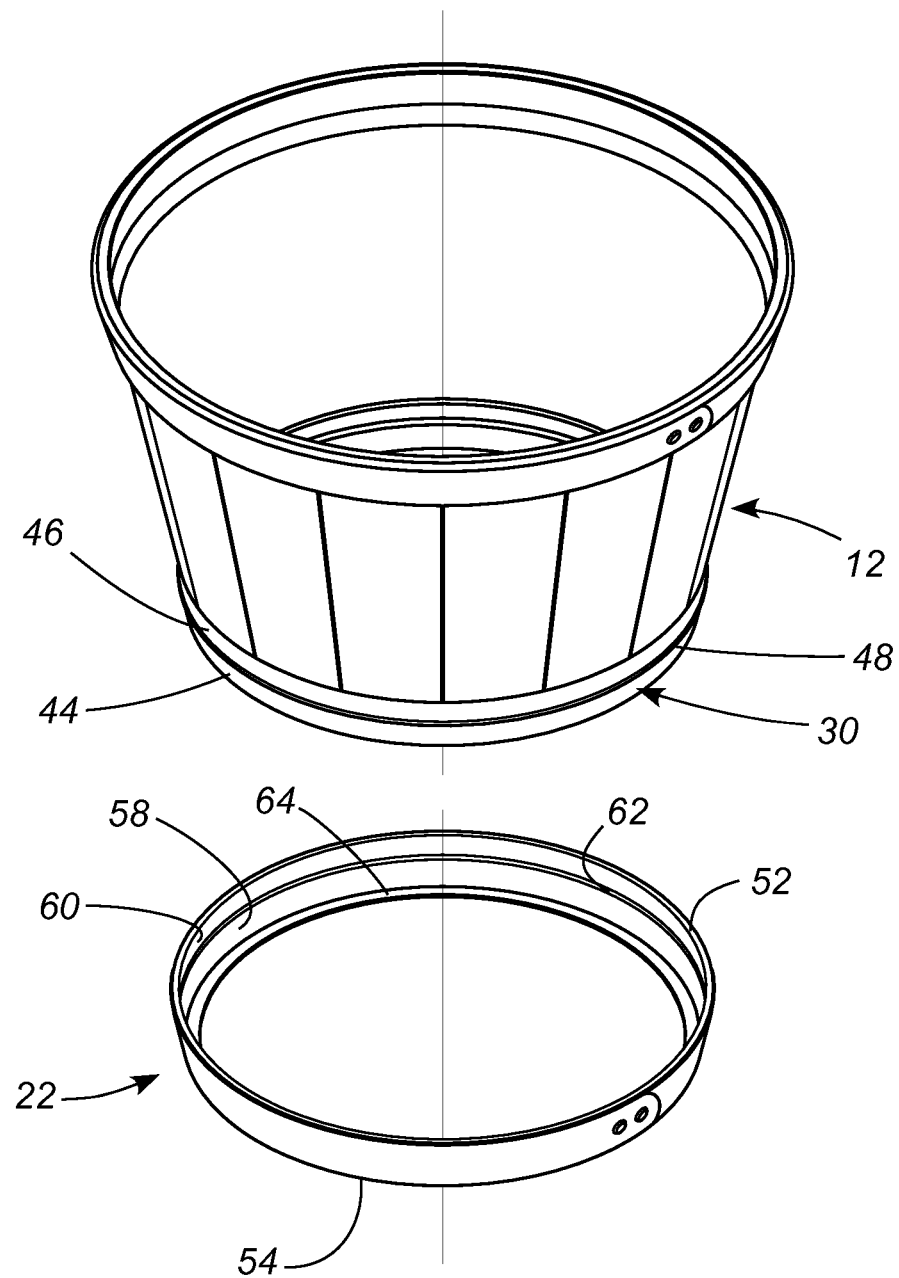
FIG. 11 is an exploded isometric view of the barrel planter of FIG. 1 comprising the main body portion of FIG. 3 and the lower ring of FIG. 8.

FIG. 11 shows the ring 22 as it is assembled onto the main body portion 12. The ring 22 is advanced over the base 18 of the main body portion 12 and couples to the base 18 as explained below.

Figure 12:
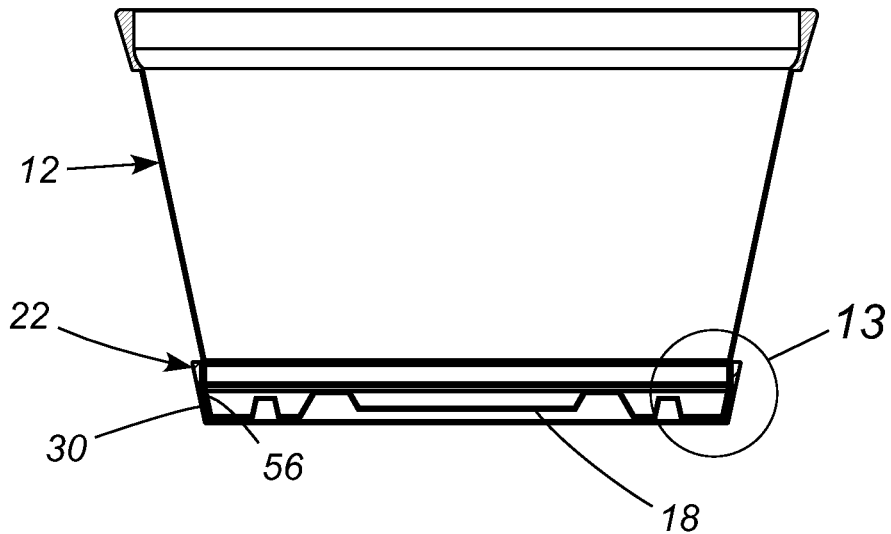
FIG. 12 is a vertical cross-section of an assembly comprising the main body portion of FIG. 3 and the lower ring of FIG. 8.
Figure 13:
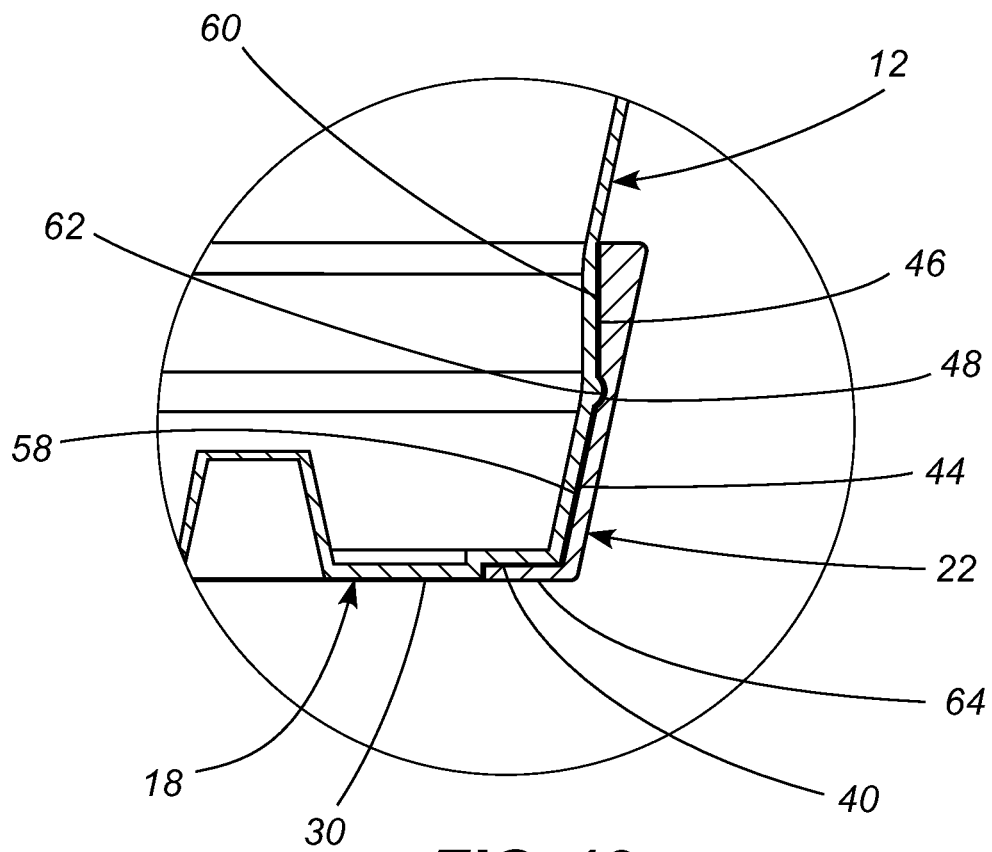
FIG. 13 is an enlarged view of the section of the assembly of FIG. 12 indicated by the circle 13.

FIGS. 12 and 13 illustrate the coupling of the ring 22 onto the main body portion 12. As the ring 22 is advanced over the base 18 of the main body portion 12, the inner wall 56 of the ring 22 confronts the circumferential wall 30 of the main body portion. In the disclosed embodiment the lower wall portion 58 of the ring 22 is imposed against the lower wall portion 44 of the circumferential wall 30 of the main body portion. The upper wall portion 60 of the ring 22 lies adjacent to the upper wall portion 46 of the circumferential wall 30. The annular flange 64 on the ring 22 confronts the lower portion of the base 18 of the main body portion 12 to prevent over advancement of the ring. The annular flange 64 on the ring 22 engages the cooperating annular channel 40 on the lower end of the main body portion 12. In the disclosed embodiment the thickness of the annular flange 64 of the ring 22 approximates the depth of the annular channel 40 on the main body portion 12 so that the bottom surface of the annular flange is flush with the outer annular portion 34 of the base 18 of the main body portion.

The male interlock projection 48 on the circumferential wall 30 snaps into the female interlock recess 62 on the inner wall 56 of the ring 22. This interlocking engagement between the male interlock projection 48 and the female interlock recess 62 retains the ring 22 in place on the lower end of the main body portion 12.

Variations on the interlock mechanism are contemplated, such as reversing the locations of the interlock structures, e.g., placing the male interlock projection 48 on the inner wall 56 of the ring 22 and placing the female interlock recess 62 on the circumferential wall 30. There is no requirement that the interlock structures be semicircular in cross section. It is not required that the shape of a female interlock recess conform to the shape of the male interlock projection, so long as the cooperating male and female portions retain the ring on the main body portion. There may be more than one male portion engaging more than one female recess, and there may be male and female structures on one component that engage cooperating female and male structures on the other component.

It is also not required that the planter described above be limited to one that replicates the appearance of a whiskey barrel. Rather, except as may be required by the language of the claims, the lower container wall configuration and cooperating ring can be used on any container where it is desired to provide a lower ring having an undercut on the molded article that impedes withdrawal of a one-piece article from a two-piece, rigid mold.

The embodiment disclosed above comprises container walls that are substantially straight between the lower container wall and the upper end of the container. However, except as may be limited by the claims, the invention is not limited to straight walls but may also include concave or convex container side walls.

Finally, it will be understood that the foregoing embodiments have been disclosed by way of example, and that other modifications may occur to those skilled in the art without departing from the scope and spirit of the appended claims.

What is claimed is:

1. A planter for holding a plant, comprising:
a container having an open upper end with a first diameter;
the container having side walls extending downward from the upper end and tapering inward to a lower end;
a base at the lower end of the container that has a second diameter smaller than the first diameter of the upper end;
a circumferential ring surrounding the lower end of the container, the circumferential ring having an upper edge that extends outward from the container;
wherein the upper edge of the circumferential ring extends outward from the container by a distance such that removal of the container and ring from a mold as a single unit would be inhibited;
wherein the container and the circumferential ring are molded as separate components from a thermoplastic material;

wherein the circumferential ring fits around the lower end of the container and is held in place by a mechanical interlock between the container and the ring;

wherein the lower end of the container adjacent the base comprises a circumferential wall;

wherein the circumferential wall at the lower end of the container comprises a generally frustoconical, angled lower wall portion that slants upward and outward from the base;

wherein the circumferential wall at the lower end of the container further comprises an upper wall portion extending substantially vertically upward from the upper end of the angled lower wall portion;

wherein an inner surface of the ring comprises a generally frustoconical, angled lower wall portion that slants upward and outward from the lower end of the ring; and wherein the inner surface of the ring further comprises an upper wall portion extending substantially vertically upward from the upper end of the angled lower wall portion of the ring;

wherein the mechanical interlock between the container and the ring comprises a male interlock projection on one of the outer surface of the container and the inner surface of the ring and a cooperating female interlock recess on the other of the outer surface of the container and the inner surface of the ring; whereby when said ring is positioned on the outside bottom portion of the container, the male interlock projection engages the cooperating female interlock recess to retain the ring on the lower end of the container; wherein one of the male interlock projection and the female interlock recess is formed on the circumferential wall at the lower end of the container approximately at the intersection between the angled lower wall portion and the upper wall portion extending substantially vertically upward from the upper end of angled lower wall portion; and wherein the other of the male interlock projection and the female interlock recess is formed on the inner surface of the ring approximately at the intersection between the angled lower ring inner wall portion and the upper ring wall portion that extends substantially vertically upward from the upper end of angled lower ring inner wall portion.

2. The planter of claim 1, wherein: an outer surface of the ring is further molded to replicate the appearance of two ends of a band overlapping, and wherein the ring is further molded to replicate the appearance of rivets in the portion of the ring molded to replicate the appearance of the overlapping band ends.

* * * * *